INVENTOR.
Frederick H. Schavoir.
BY G. H. Braddock
ATTORNEY.

Patented Sept. 22, 1925.

1,554,599

UNITED STATES PATENT OFFICE.

FREDERICK H. SCHAVOIR, OF STAMFORD, CONNECTICUT.

METHOD AND APPARATUS FOR MAKING HOLLOW RUBBER ARTICLES.

Application filed March 1, 1924. Serial No. 696,192.

*To all whom it may concern:*

Be it known that FREDERICK H. SCHAVOIR, a citizen of the United States, and resident of Stamford, in the county of Fairfield and State of Connecticut, has invented certain new and useful Improvements in Methods and Apparatus for Making Hollow Rubber Articles, of which the following is a specification.

This invention relates to a method of and an apparatus for making hollow articles of plastic materials, and has more especial reference to a method and an apparatus for making articles of the general type of rubber flush tank bulbs or valve balls.

A valve ball for use in a flush tank must have special characteristics suiting it to its purpose. Its lower section is usually hemispherical and must be comparatively flexible to seat in a discharge orifice. Its upper section is usually conical and must be comparatively rigid to overcome the tendency of suction in a discharge pipe to distort or collapse the lower comparatively flexible section, it being understood that the upper and lower sections must be firmly secured to each other, and said upper section must also have sufficient body to fixedly carry the usual threaded collar or spud receiving the usual operating or supporting rod, said spud with rod customarily being situated at the apex of said upper or conical section, opposite said lower or hemispherical section.

It is an object of the present invention to provide a simple method and a novel apparatus which will be an improvement generally upon all methods and apparatus now being employed in the manufacture of hollow articles of the nature of valve balls from plastic materials.

Another object is to provide an improved method for manufacturing articles of the nature of valve balls which will require a minimum number of the simplest steps in its practice to produce the articles.

Another object is to provide a method designed to produce the comparatively rigid sections of articles of the nature of valve balls and to incorporate the collars or spuds in said sections in a novel and unique manner.

Another object is to provide a method designed to produce the comparatively flexible sections of articles of the nature of valve balls in such manner that they will be of uniform thickness throughout, to best serve their purpose in use as will be obvious.

Another object is to provide a method designed to economically produce an improved valve ball consisting of a comparatively flexible section, a comparatively rigid section, and an operating rod receiving collar or spud, both of said sections consisting of plastic material and said collar or spud being incorporated in said comparatively rigid section.

Another object is to provide a method and an apparatus of the present character adapted to the purposes (1) of acting upon stock which is to provide the comparatively rigid section of a valve ball and upon a spud, to shape said stock to provide said comparatively rigid section and to properly imbed or incorporate said spud in said comparatively rigid section; (2) of acting upon stock which is to provide the comparatively flexible section, to shape said stock by uniformly drawing, spreading, or stretching the same over the entire area of the stock; and (3) of joining said sections to each other, severing surplus stock from the sections, to produce the "biscuit" of the article being manufactured to be afterwards vulcanized.

Another object is to provide a simple and improved apparatus equipped with novel mechanisms for carrying out all of the steps of the novel method.

Other objects of the invention will be obvious from the drawings and description of the apparatus and method embodying the invention which have been selected for the purpose of illustration, it being understood that the disclosure herein is merely illustrative of principles and meant to in no way limit the scope of the appended claims.

In the accompanying drawing forming a part of this specification,

Fig. 1ª is a fragmentary, detail sectional view, on an enlarged scale, of an upper and a lower plunger and form, with certain associated parts, corresponding with the showing of Fig. 1;

Fig. 2ª is a view, after the fashion of Fig. 1ª, corresponding with the showing of Fig. 2;

Fig. 3ª is a view, after the fashion of Fig. 2ª, corresponding with the showing of Fig. 3;

Fig. 4ª is a view, after the fashion of Fig. 3ª, corresponding with the showing of Fig. 4;

Fig. 5ª is a view, after the fashion of Fig. 4ª, corresponding with the showing of Fig. 5;

Fig. 6ª is a view, after the fashion of Fig. 5ª, corresponding with the showing of Fig. 6;

The present invention relates to a method and apparatus somewhat similar to the method and apparatus illustrated and described in the patent to Arnold L. Schavoir, No. 1,441,603, granted January 9, 1923, and adds to the disclosure of said patent various features essential to the manufacture of devices of the type of valve balls as already set forth. In said patent, each half or section of a hollow article is produced by uniformly drawing, spreading, or stretching stock of plastic material, such as rubber, over the entire area of the stock to form the parts of the article and to make the wall of each part of uniform thickness, and the halves or sections are secured to each other to produce the "biscuit" of the hollow article. The lower or comparatively flexible section of the valve ball of this invention is preferably so produced, and the present invention additionally contemplates the production of the upper or comparatively rigid section of the valve ball with collar or spud for receiving a supporting or operating rod incorporated, and the securing of the produced upper and lower sections to each other. To the accomplishment of the ends as stated forms or molds (shown as the lower forms in the drawings) are provided in which the upper comparatively rigid sections of valve balls or the like can be shaped to desired configuration and can each have a collar or spud imbedded or incorporated, and forms (shown as the upper forms in the drawing) are provided across which plastic material can be placed to be drawn, spread or stretched into the forms to produce the lower or comparatively flexible sections each preferably having its wall of uniform thickness. In the instance of each article, the comparatively rigid section is desirably formed with collar or spud incorporated before the comparatively flexible section is formed. First, the plastic stock to furnish this rigid section is placed across a lower form or mold and is drawn in unique manner into the same, and then a plunger descends to cooperate in imbedding the spud. Afterwards this plunger returns to its normal position, within an upper form directly opposite (vertically above) the lower form having the completed comparatively rigid section, to allow stock to furnish the comparatively flexible section to be placed across the mouth of said upper form. After the stock is so placed, this cooperating plunger recedes in said upper form to draw, spread, or stretch the stock to produce the lower, flexible section of the article. And finally, the forms having the completed sections are brought together to knit and seal the sections to each other and to sever surplus stock from the finished "biscuit" of the article to be later vulcanized.

The plastic stock utilized is ordinarily rubber compound in sheet form, the stock for providing the comparatively rigid sections being thicker than that for providing the comparatively flexible ones, desirably twice as thick. In fact, the rigid sections can be made from superimposed sheets of the rubber of the flexible ones. Preferably, though not necessarily, the stock for the rigid sections is plastic material of precisely the nature of that for the flexible sections.

Referring to the drawing, 10 denotes a stand having any desired number of uprights 11 and supporting the stationary piston 12 of an air press, the movable cylinder 13 of which supports a lower form- or mold-carrying member 14, the member 14 resting squarely upon the cylinder 13. Numeral 16 denotes an upper form-carrying member having lugs or extensions 17 fixed upon the upper portions of the uprights 11 as at 15. The members 14 and 16 may be of any construction suitable to their purpose. As shown, each is a cylinder having a closed and an open end.

Figure 1:
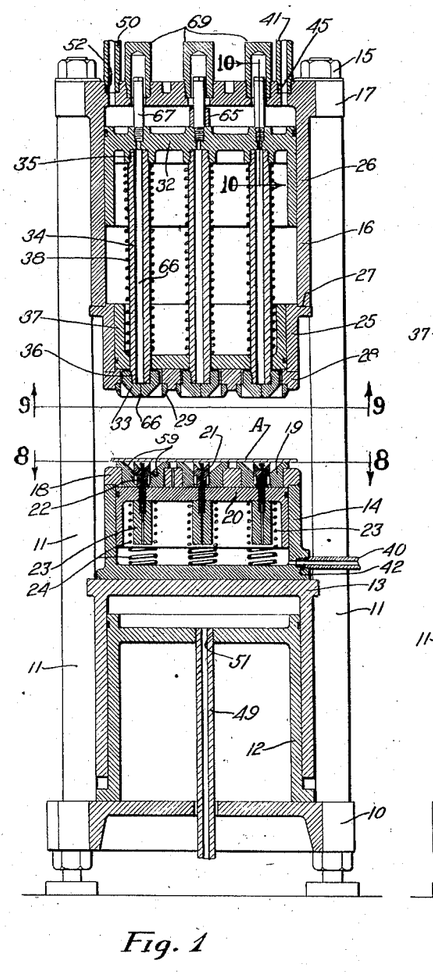
Fig. 1 is a vertical, central sectional view of an apparatus embodying the features of the invention and illustrating a manner in which the method can be practiced, all of the working parts of the apparatus being in their normal, inactive positions, and stock being shown placed over the mouths of the lower forms or molds to be shaped to provide comparatively rigid sections of articles having the nature of valve balls.
Figure 1A:
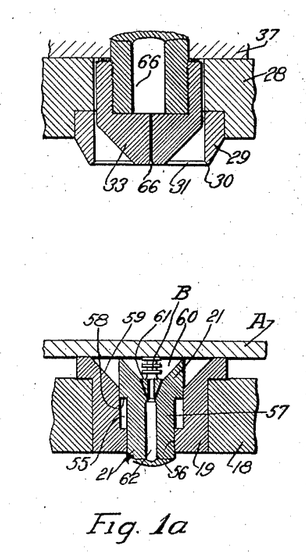

Numeral 18 denotes a plate, secured to the upper, open end of the form- or mold-carrying member or cylinder 14, having openings removably receiving forms or molds 19 of the peculiar construction to be described. 20 denotes a carrying head or piston arranged in said cylinder 14, and 21 denotes suction plungers, also of peculiar construction, secured to said carrying head and slidably received in said forms or molds 19. As disclosed, the plungers 21 have necks 22 extending through the base of the carrying head 20 and secured to posts 23 arranged against the under face of said base, the posts serving to hold in position coil springs 24 about said posts, said springs having their opposite ends bearing against the base of the cylinder 14 and the base of the carrying head 20 to normally hold said carrying head at its highest elevation as it is shown in Fig. 1, with the upper edges of the plungers 21 desirably flush with or a trifle below the top surfaces of the molds 19.

Numeral 25 represents a lower portion of the form-carrying member or cylinder 16 which could be integral with the upper portion 26 thereof but which is illustrated as secured thereto at 27, and 28 denotes a plate, secured to the lower end of the portion 25 (the open end of the cylinder 16), having openings removably receiving forms 29 arranged opposite the molds 19, there being a form 29 located in vertical alignment with each mold 19 and provided with a severing, knitting and sealing knife, each knife including a cutting edge 30 and a knitting and sealing face 31 adapted to cooperate in usual manner with the cutting edge, the molds 19 being shaped adjacent their open ends to assist the cutting edges and knitting faces of the knives in the severing and sealing operation as to be made clear. 32 denotes a carrying head or piston arranged in the cylinder 16, and 33 denotes plungers, sometimes serving as pressure plungers and sometimes as suction plungers, secured to the head or piston 32 by mean of posts 34. As disclosed, the upper ends of said posts 34 are threaded, as at 35, into the base of the carrying head 32 and the lower ends of said posts are threaded, as at 36, into the plungers 33.

The plungers 33 are of a construction to cooperate with the molds 19 in forming the upper or comparatively rigid sections of the article to be produced and to incorporate the spuds in said sections, said plungers and molds in fact cooperating to supply dies for shaping said upper sections. Normally, the plungers 33 are situated as in Figs. 1, 2 and 4, preferably to have their lower edges flush with or a trifle above the bottom surfaces of the forms 29. They are, however, adapted to move a considerable distance below this position when serving as pressure plungers to shape the comparatively rigid sections and to incorporate their spuds, as in Fig. 3, or to move slightly above said position when serving as suction plungers to uniformly draw plastic stock into the forms 29, as in Figs. 5 and 6. To the accomplishment of these results, a loose piston 37 may be situated within the portion 25 of the cylinder 16 to normally rest upon the plate 28, the lower end portions of the posts 34 passing through the base of the loose piston and being slidable therein, and coil springs 38 may be arranged about said posts 34 to have their opposite ends bear against the bases of the carrying head 32 and loose piston 37, respectively, to normally hold said carrying head at fixed distance from said loose piston, the carrying head 32 being normally spaced from the closed end of the member 16, whereby said head can move from its position in Figs. 1, 2 and 4 upwardly against gravity, carrying the plungers 33 and loose piston with it, as in Figs. 5 and 6, or can move downwardly against the action of the springs 38, as in Fig. 3, the posts 34 now sliding in the loose pistons 37, itself resting upon the plate 28.

Numeral 39 represents a pipe line leading from vacuum producing means and joining with two pipes 40 and 41, the pipe 40 entering the cylinder 14, as denoted at 42, beneath the carrying head 20 and having a valve 43 with control 44, and the pipe 41 entering the cylinder 16, as denoted at 45, above the carrying head 32 and having a valve 46 with control 47.

Numeral 48 represents a pipe line leading from a source of air supply and joining with two pipes 49 and 50, the pipe 49 communicating with the chamber between the cylinders of the air press, as at 51, and the pipe 50 entering the cylinder 16, as at 52, above the carrying head 32, there being a four-way valve 53 with vent 53' and control 54 at the junction of the pipe 48 with the pipes 49 and 50. The four-way valve 53 has a one port plug so that either of pipes 49, 50 can be connected to the source of aid supply pipe 48 or open to vent to the outside air. It is, therefore, possible to operate either air press at will, but impossible to operate both at the same time.

Figure 2:
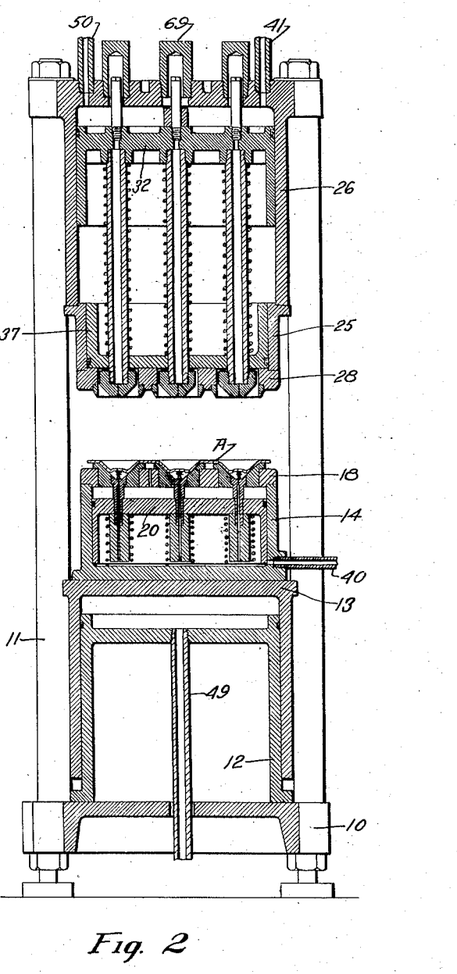
Fig. 2 is a view corresponding with the showing of Fig. 1, but disclosing the lower plungers as when the stock for forming the upper or conical sections of valve balls has been drawn into the lower forms or molds.

In Fig. 1 of the drawing all of the working parts of the apparatus are shown in their normal, inactive position, and rubber stock A for forming the comparatively rigid sections of valve balls is shown arranged across the open ends of the forms or molds 19. In Fig. 2 the suction plungers 21 are shown as when moved to their lowest possible elevation, the vacuum producing means connected with the cylinder 14 having been actuated to exhaust air from the chamber within said cylinder beneath the carrying head or piston 20 so that atmospheric pressure above said head or piston has depressed the same against the action of the coil springs 24.

Referring more particularly to Figs. 1a to 6a, inclusive, it will be seen that each form or mold 19 includes a concavity 55 receiving a plunger 21, and an opening 56 at the bottom of said concavity receiving a reduced, preferably cylindrical portion 57 of said plunger providing a circumferential shoulder 58 about each suction plunger 21 adapted to engage the base of the concavity 55 about the opening 56 to limit downward movement of the plungers 21. As disclosed, each mold 19 has a conically shaped interior 59 terminating at the concavity 55, and the upper end of each suction plunger 21 has a preferably conical concavity 60 extending over practically the whole of said upper end, the bottom of said concavity 60 including a preferably centrally situated flat surface 61 upon which a collar or spud B is adapted to be placed. Numeral 62 represents a passage extending longitudinally through each suction plunger 21 reduced neck 22 and post 23 allowing communication between the vacuum producing means and the conical concavities 60 through the ducts 63 between said passages and concavities. Pins (not shown) arranged in depressions 64 in the plungers 21 beneath the surfaces 61 and entering the spuds may serve to situate the spuds in the concavities 60 upon their flat surfaces 61.

Figure 2A:
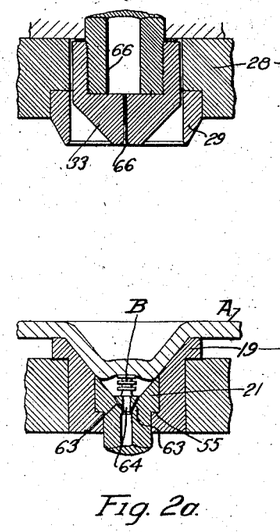

As will be apparent, upon producing vacuum in the cylinder 14 beneath the carrying head 21 and passages 62, the air will first be removed from the concavities 60, causing the rubber stock A to be pulled down and held to the plunger 21 and against spuds B. Afterwards, the vacuum will cause the suction plungers 21 to recede in the forms, drawing, spreading or stretching the stock into the forms or molds as in Figs. 2 and 2a. Note that the part of the rubber stock to form the conical part of the comparatively rigid section is in Fig. 2a shown in contact with the conical surface 59 of the mold 19, while the part of said stock to form the thicker apex of said rigid section is resting upon the spud B and is buckled downwardly somewhat about said spud.

Figure 3:
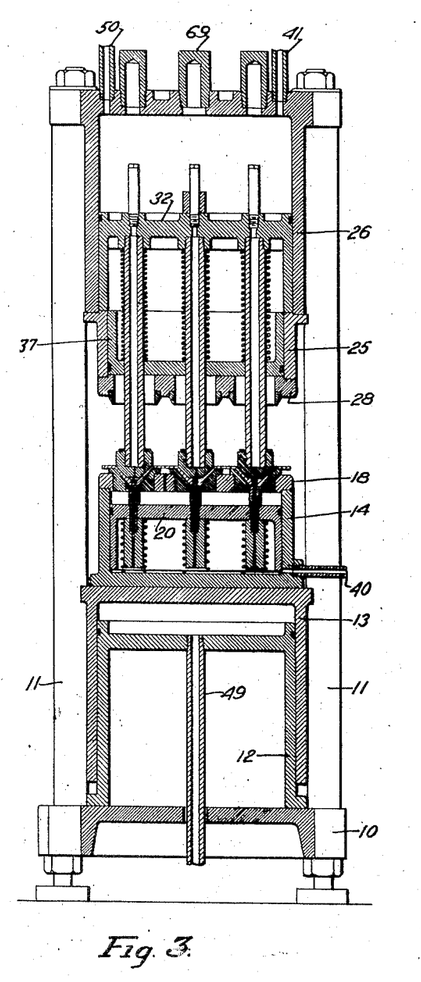
Fig. 3 is a view corresponding with the showing of Fig. 2, disclosing the upper plungers in the act of cooperating with the lower forms or molds in imbedding or incorporating the collars or spuds in the upper, or conical sections of valve balls and in shaping said sections to their desired configuration.
Figure 3A:
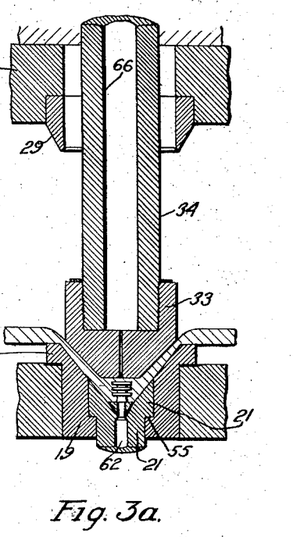

In Fig. 3 the plungers 33 are shown depressed, cooperating with the molds 19 and with the upper ends of the plungers 21 (forming continuations of the conical surfaces 59) in shaping the comparatively rigid sections and in incorporating the spuds, the pressure producing means connected with the interior of the cylinder 16 above the carrying head or piston 32 having been actuated to apply air to the chamber between the bases of the cylinder 16 and said carrying head. As before described, the plungers 33 are shaped to compress the stock A into the molds 19, and to force the rubber stock to the bottoms of the concavities 60, about the spuds B to imbed said spuds into the conical or comparatively rigid sections. See Fig. 3a. Naturally, the portion of stock buckled about each spud, below its top surface, provides filling material making the apex of the comparatively rigid section thicker than the remainder thereof, giving the result desired as illustrated. As shown more particularly in Fig. 3, engagement of the lower edge of the carrying head or piston 32 with the upper edge of the lower portion 25 of the cylinder or member 16 limits downward movement of the carrying head or piston 32 and its plungers. This downward movement should be terminated before the upper ends of the spuds have been driven clear through the stock. See Fig. 3a.

Figure 4:
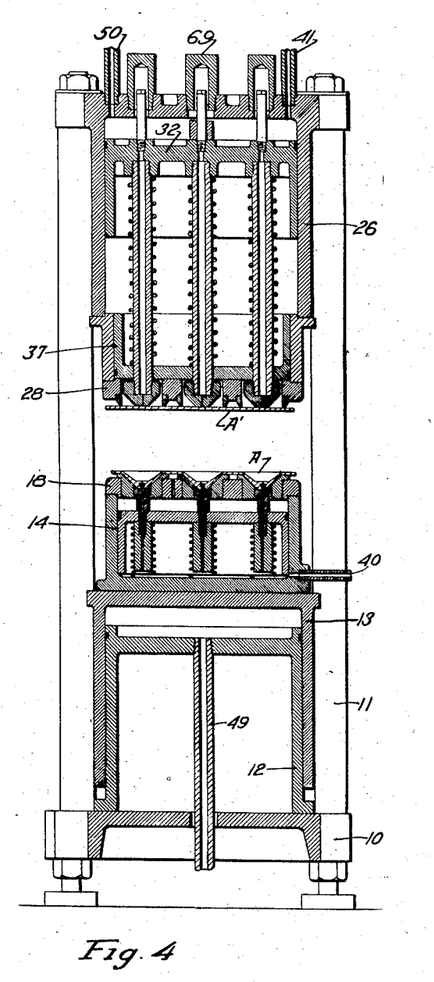
Fig. 4 is a view corresponding with the showing of Fig. 3, but disclosing the upper plungers moved back to their normal position, as in Figs. 1 and 2, the upper forms being shown as having just received stock to provide the lower or hemispherical sections of valve balls.
Figure 4A:
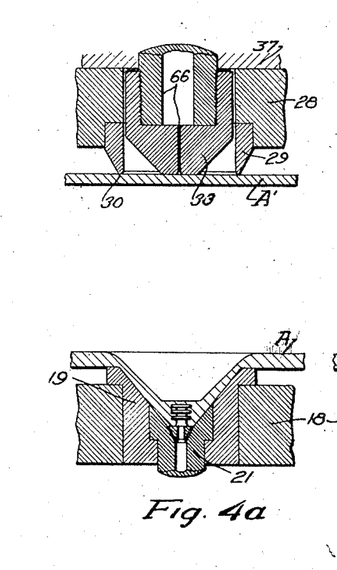

In Fig. 4 the pressure above the carrying head or piston 32 has been released, and the coil springs 38 have returned the plungers back to their normal position. Sheet rubber A' for forming the comparatively flexible or hemispherical sections of the valve balls is at this time placed over the mouths of the forms 29.

Figure 5:
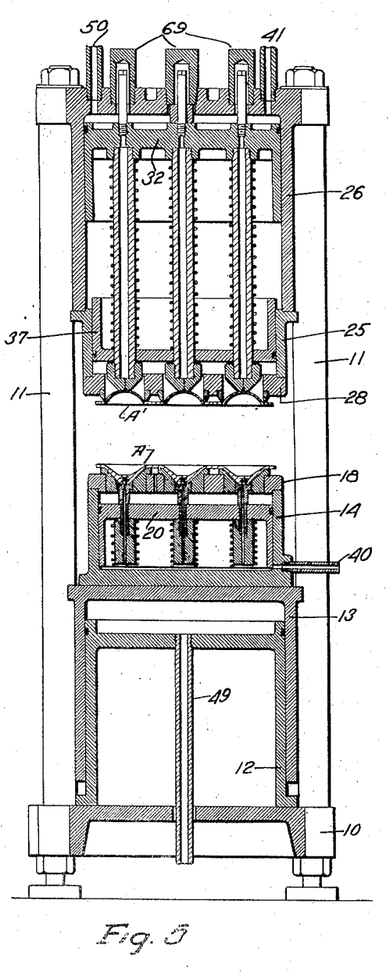
Fig. 5 is a view corresponding with the showing of Fig. 4, but disclosing the upper plungers as when the stock for forming the lower or hemispherical sections of valve balls has been drawn, spread or stretched into the upper forms.

In Fig. 5 the plungers 33 have been elevated to serve as suction plungers to draw, spread, or stretch the stock into the forms 29, the vacuum producing means having been actuated to exhaust air from the space in the cylinder 16 above the carrying head or piston 32 and air pressure beneath the plungers 33 and the loose piston having elevated said carrying head 32, loose piston 37, and plungers 33 against the action of gravity. Numeral 65 denotes a stop upon the upper face of the base of the carrying head or piston 32 adapted to engage a part of the base of the cylinder 16 to limit upward movement of the plungers 33.

Figure 10:
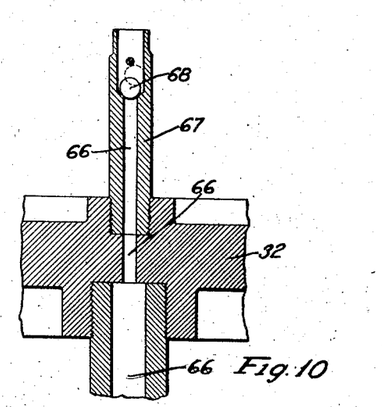
Fig. 10 is an enlarged detail sectional view on line 10—10 in Fig. 1.

Numeral 66 denotes air passages leading from the chamber of the cylinder 16 above the carrying head 32, communicating through tubes 67, the base of the carrying head 32, the posts 34 and the suction plungers 33 with the interior of each form 29, the passages being desirably arranged at the center of each plunger 33 to positively release any air which may become trapped between the stock A' and the forms and plungers, and to serve as a means for holding the stock to the plunger when the air pressure above the piston 32 is reduced below atmospheric pressure. In Fig. 10 is disclosed a gravity check valve 68 in each tube 67, for the obvious purpose of precluding the passage of air to and through the plungers 33 when acting as pressure plungers, the chamber of the cylinder 16 above the base of the carrying head or piston 32 at this time having compressed air. Numeral 69 denotes caps conveniently located in the base of the cylinder or member 16 to receive the tubes 67, the caps being removably threaded in said cylinder, and the tubes being removably threaded in the base of the carrying head 32.

As the plungers 33 move from their position of Fig. 4 to their position of Fig. 5, the stock A' is uniformly drawn, spread, or stretched into the forms 29 so that the wall of each comparatively flexible or hemispherical section is of uniform thickness throughout, all of the plungers 33 sucking from the circumferences of the forms toward and to the centers thereof over the entire areas of the sections.

Figures 5A, 6A:
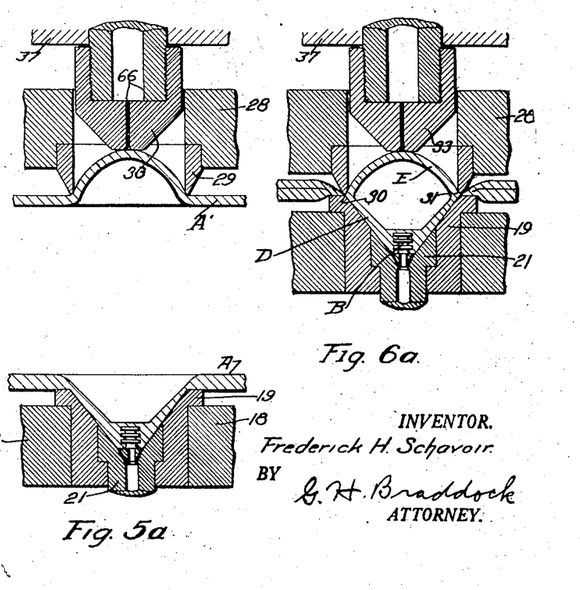
Figure 6:
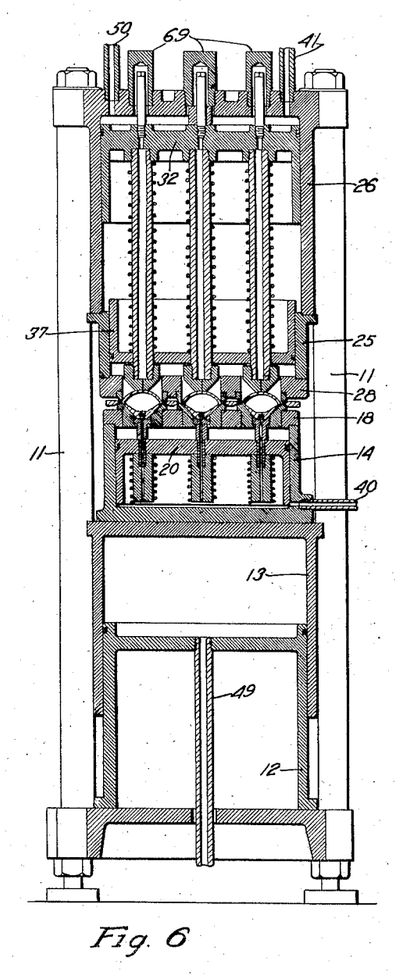
Fig. 6 is a view corresponding with the showing of Fig. 5, but disclosing the movable cylinder of the air press of the apparatus in the position it assumes as the knitting or sealing and severing knives perform their function.
Figure 7:
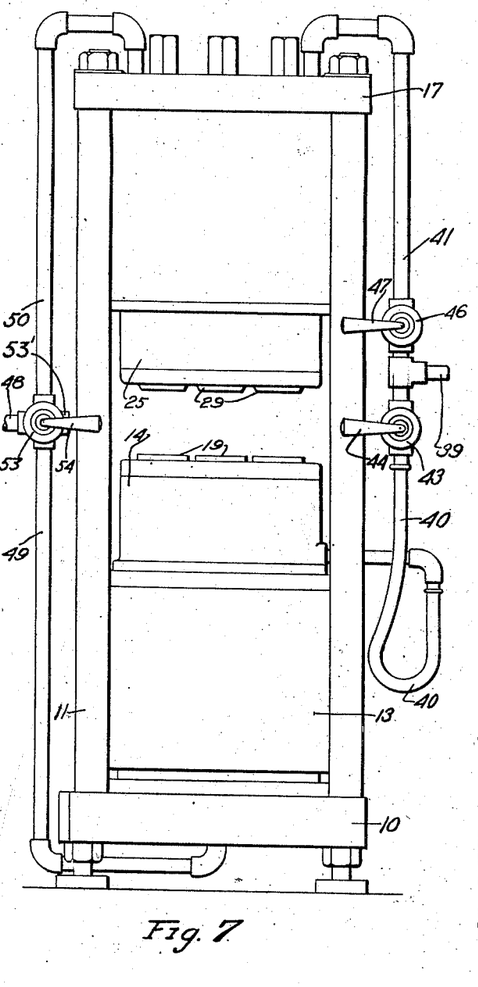
Fig. 7 is an elevational view of the apparatus of Figs. 1 to 6, disclosing pipe connections for obtaining pressure and vacuum for operating the working parts of the apparatus.

In Fig. 6 the movable cylinder 13 of the air press is shown in the position it assumes to cause the severing and sealing knives of the forms 29 to seal the "biscuits" of the valve balls and to remove surplus stock, the pressure producing means having been actuated to introduce compressed air into the air press. The operation is plainly shown in Figs. 6 and 6ᵃ, and is not sufficiently unlike the operation usually performed to seal "biscuits" to require further description, other than to remark that the air actuated mechanism or air press is quicker and more positive in its action than the hydraulic press customarily employed, it building up power to exert a yielding blow in the final stage of the severing and sealing operation to produce a durable and secure seal, and, at the same time, necessitating less wear upon the cutting edges of the knives.

The moment the air is released from the interior of the air press, the movable cylinders 13 and 14 immediately return by gravity from their position of Fig. 6 to their position of Fig. 5, to space the molds 19 and forms 29 at suitable distance apart to allow removal of the finished "biscuits". Then when the vacuum in the cylinders 14 and 16 is destroyed the pistons 20 and 32 return to their normal position as in Fig. 1, the piston 32 by gravity and the piston 20 by reason of power exerted by the coil springs 24. As the plungers move toward each other the "biscuits" are, naturally, pushed from the forms and molds, thus removing the objectionable feature of "sticking" of the "biscuits".

While I have described the carrying members 14 and 16 as cylinders it will be apparent that the carrying heads 20 and 32 can be reciprocated to move the plungers 21 and 33 in some different manner, as by means of mechanical devices no shown.

Figure 8:
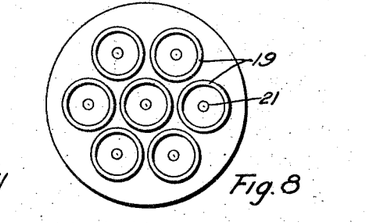
Fig. 8 is a plan view as on line 8—8 in Fig. 1.
Figure 9:
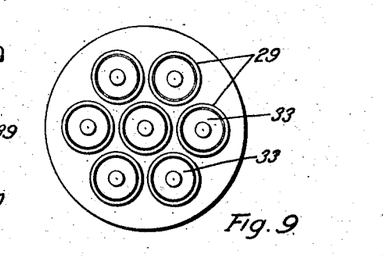
Fig. 9 is a plan view as on line 9—9 in Fig. 1.

Referring to Figs. 8 and 9, it will be seen that the apparatus illustrated is adapted to manufacture seven "biscuits" at a time. However, more or less "biscuits" can be simultaneously manufactured by providing a greater or a less number of stations. Also, articles of a size different from that shown can be made in the apparatus by making a few slight changes, such as replacing the plates 18 and 28, the forms and molds 19 and 29, the plungers 21 and 33, and altering the length of the stroke of the carrying heads or pistons.

Having thus fully described the invention, what I claim as new and desire to secure by Letters Patent is:

1. The method of making a hollow plastic article comprising a comparatively flexible section, a comparatively rigid section, and a spud carried by said comparatively rigid section, which consists in the continuous operations of shaping stock to provide said comparatively rigid section and incorporating said spud during the shaping operation on said stock, shaping stock to provide said comparatively flexible section, and in joining said provided sections to each other.

2. The method of making a hollow plastic article comprising a comparatively flexible section, a comparatively rigid section having thickness greater than said comparatively flexible section, and a spud carried by said comparatively rigid section, which consists in the continuous operations of shaping stock to provide said comparatively rigid section and simultaneously incorporating said spud during the shaping operation on said stock, shaping stock to provide said comparatively flexible section, and in joining said sections to each other.

3. The method of making a hollow plastic article comprising a comparatively flexible section, a comparatively rigid section having thickness greater than said comparatively flexible section, said sections consisting of unvulcanized stock of identical nature, and a spud carried by said comparatively rigid section, which consists in the continuous operations of shaping stock to provide said comparatively rigid section and simultaneously incorporating said spud during the shaping operation on said stock, shaping stock to provide said comparatively rigid section, joining said sections to each other, and in afterwards vulcanizing the material of the joined sections.

4. The method of making a hollow plastic article comprising a comparatively flexible section, a comparatively rigid section, and a spud carried by said comparatively rigid section, which consists in the continuous operations of placing a spud in a mold cavity, placing stock to provide said comparatively rigid section in said mold cavity, compressing said stock in said cavity to shape the comparatively rigid section to form and to incorporate the spud therein, placing stock to provide said comparatively flexible section across the mouth of a form and shaping said last mentioned stock to provide said relatively flexible section, and securing said sections to each other.

5. The method of making a hollow plastic article comprising a comparatively flexible section, a comparatively rigid section, and a spud carried by said comparatively rigid section, which consists in the continuous operations of placing a spud in a mold cavity, placing stock to provide said comparatively rigid section in said mold cavity, compressing said stock in said cavity to shape the comparatively rigid section to form and to incorporate the spud therein, placing stock to provide said comparatively flexible section across the mouth of a form and shaping said last mentioned stock to provide said comparatively flexible section, and bringing said mold and form together to unite the sections in the mold and form and to sever surplus material from said stock, to provide the "biscuit" of said article.

6. The method of making a hollow plastic article comprising a comparatively flexible section, a comparatively rigid section, and a spud carried by said comparatively rigid section, which consists in the continuous operations of placing a spud in a mold cavity, placing stock to provide said comparatively rigid section across the mouth of said mold cavity, drawing said stock into said cavity against its wall and against the spud, compressing said stock in said cavity to shape the comparatively rigid section to form and to incorporate the spud therein, placing stock to provide said comparatively flexible section across the mouth of a form and shaping said last mentioned stock to provide said relatively flexible section, and securing said sections to each other.

7. The method of making a hollow plastic article comprising a comparatively flexible section, a comparatively rigid section, and a spud carried by said comparatively rigid section, which consists in the continuous operations of placing a spud in a mold cavity, placing stock to provide said comparatively rigid section across the mouth of said mold cavity, drawing said stock into said cavity against its wall and against the spud, compressing said stock in said cavity to shape the comparatively rigid section to form and to incorporate the spud therein, placing stock to provide said comparatively flexible section across the mouth of a form and shaping said last mentioned stock to provide said comparatively flexible section, and bringing said mold and form together to unite the sections in the mold and form and to sever surplus material from said stock, to provide the "biscuit" of said article.

8. The method of making a hollow plastic article comprising a comparatively flexible section, a comparatively rigid section, and a spud carried by said comparatively rigid section which consists in placing a spud in the cavity of a suction plunger situated within a mold cavity, in placing stock to provide said comparatively rigid section across the mouths of said mold cavity and plunger cavity, in exhausting air from said plunger cavity to draw the stock into said plunger cavity against said spud, in causing said suction plunger to recede in said mold cavity to draw stock into the mold cavity against the wall thereof, in compressing said stock into said cavities to shape the comparatively rigid section and to incorporate the spud therein, in placing stock to provide said comparatively flexible section across the mouth of a form and shaping said last mentioned stock to provide said relatively flexible section, and in securing said sections to each other.

9. The method of making a hollow plastic article comprising a comparatively flexible section, a comparatively rigid section, and a spud carried by said comparatively rigid section, which consists in placing a spud in the cavity of a suction plunger situated within a mold cavity, in placing stock to provide said comparatively rigid section across the mouths of said mold cavity and plunger cavity, in exhausting air from said plunger cavity to draw the stock into said plunger cavity against said spud, in causing said suction plunger to recede in said mold cavity to draw stock into the mold cavity against the wall thereof, in compressing said stock into said cavities to shape the comparatively rigid section and to incorporate the spud therein, in placing stock to provide said comparatively flexible section across the mouth of a form and shaping said last mentioned stock to provide said comparatively flexible section, and in bringing said mold and form together to unite the sections in the mold and form and to sever surplus material from said stock to provide the "biscuit" of the article.

10. The method of making a hollow plastic article comprising a comparatively flexible section, a comparatively rigid section, and a spud carried by said comparatively rigid section, which consists in placing a spud in the cavity of a suction plunger situated within a mold cavity, in placing stock to provide said comparatively rigid section across the mouths of said mold cavity and plunger cavity, in exhausting air from said plunger cavity to draw the stock into said plunger cavity against and about said spud, in causing said suction plunger to recede in said mold cavity to draw stock into the mold cavity against the wall thereof, in compressing said stock into said cavities to shape the comparatively rigid section and to incorporate the spud therein, in placing stock to provide said comparatively flexible section across the mouth of a form and shaping said last mentioned stock to provide said comparatively flexible section, and in securing said sections together.

11. The method of making a hollow plastic article comprising a flexible section, a rigid section, and a spud carried by said rigid section, which consists in placing a spud in the cavity of a suction plunger situated in a mold cavity, in placing stock to provide said rigid section across the mouths of said mold cavity and plunger cavity, in exhausting air from said plunger cavity to draw the stock into said plunger cavity against and buckled about said spud, in causing said suction plunger to recede in said mold cavity to draw stock into the mold cavity, in compressing said stock into said cavities to shape the rigid section and to incorporate the spud therein, in placing stock to provide said flexible section across the mouth of a form and shaping said last mentioned stock to provide said flexible section, and in bringing said mold and form together to unite the section in the mold and form and to sever surplus material from said stock, to provide the "biscuit" of said article.

12. The method of making a hollow plastic article comprising a comparatively flexible section, a comparatively rigid section, and a spud carried by said comparatively rigid section, which consists in placing a spud in the cavity of a suction plunger situated within a mold cavity, in placing stock to provide said comparatively rigid section across the mouths of said mold cavity and plunger cavity, in exhausting air from said plunger cavity to draw the stock into said plunger cavity against said spud, in causing said suction plunger to recede in said mold cavity to draw stock into the mold cavity against the wall thereof, in compressing said stock into said cavities to shape the comparatively rigid section and to incorporate the spud therein, in placing stock to provide said comparatively flexible section across the mouth of a form, and in applying suction to said last mentioned stock progressively from adjacent the form toward the center thereof to evenly draw the stock into the form to provide said comparatively flexible section with a wall of uniform thickness, and in securing said sections to each other.

13. The method of making the comparatively rigid section of a valve ball, which consists in placing a spud in the cavity of a suction plunger situated within a mold cavity, in placing stock to provide said comparatively rigid section across the mouths of said mold cavity and plunger cavity, in exhausting air from said plunger cavity to draw the stock into said plunger cavity against said spud, and in causing said suction plunger to recede in said mold cavity to draw stock into the mold cavity, and in compressing said stock into said cavities to shape the comparatively rigid section and to incorporate the spud therein.

14. The method as specified in claim 13, wherein the stock is originally drawn into the plunger cavity in such manner as to be buckled about the spud to remain in this buckled position while the suction plunger is drawing the stock into the mold cavity.

15. In an apparatus of the character described, a suction plunger having a cavity, a form in which said suction plunger is adapted to reciprocate, the cavity of said plunger lying within said form, and means for exhausting air from said cavity and for causing said suction plunger to recede in said form, in combination with a plunger adapted to enter said form, for the purpose described.

16. In an apparatus of the character described, a suction plunger having a cavity in its end, a form in which said plunger is adapted to reciprocate, means for exhausting air from said cavity to draw stock into said plunger, and mechanism for causing said suction plunger to recede in said form to draw said stock into said form, in combination with a plunger adapted to engage said stock and compress it in said form and cavity of said plunger.

17. In an apparatus of the character described, a suction plunger having a cavity adapted to receive a spud, a form in which said plunger is adapted to reciprocate, means for exhausting air from said cavity to draw stock into the plunger and against said spud, mechanism for causing said suction plunger to recede in said form to draw stock into said form, and a device adapted to engage said stock to shape it to said form and plunger cavity and to thus incorporate said spud in the stock.

18. In an apparatus of the character described, a suction plunger having a cavity adapted to receive a spud, a form in which said suction plunger is adapted to reciprocate, the cavity of said plunger lying within said form, means for withdrawing air from said cavity to draw stock into the plunger and against said spud, mechanism for causing said suction plunger to recede in said form to draw stock into said form, and a device adapted to engage said stock to shape it to said form and plunger cavity and to thus incorporate said spud in the stock.

19. In an apparatus of the character described, a suction plunger having a cavity adapted to receive a spud, a form in which said suction plunger is adapted to reciprocate, means for exhausing air from said cavity to draw stock into the plunger against and buckled about said spud, mechanism for causing said suction plunger to recede in said form to draw stock into said form, and a device adapted to engage said stock to shape it to said form and plunger cavity and to thus incorporate said spud in the stock.

20. In an apparatus of the character described, a suction plunger having a cavity adapted to receive a spud, a form in which said suction plunger is adapted to reciprocate, the cavity of said plunger lying within said form, means for exhausting air from said cavity to draw stock into the plunger against and buckled about said spud, mechanism for causing said suction plunger to recede in said form to draw stock into said form, and a device adapted to engage said stock to shape it to said form and plunger cavity to thus incorporate said spud in the stock.

21. In an apparatus of the character described, a suction plunger having a cavity adapted to receive a spud, a form in which said suction plunger is adapted to reciprocate, the cavity of said plunger lying within said form, means for exhausting air from said cavity to draw stock into the plunger against said spud, mechanism for causing said suction plunger to recede in said form to draw stock into said form while said suction plunger is holding its stock, and a device adapted to compress said stock in said form and plunger cavity to shape the same and to incorporate the spud in the stock.

22. In an apparatus of the character described, a form having a cavity and adapted to receive stock across its mouth, a suction plunger adapted to reciprocate in said form, said suction plunger having a cavity adapted to receive a spud, said stock adapted to lie across the cavity of said suction plunger to close the same, means for exhausting air from said plunger cavity to draw said stock against said spud, means for causing said suction plunger to recede in said form to draw said stock into said form and adjacent said suction plunger, and a device for forming with said form and plunger cavity a die adapted to incorporate said spud in said stock and to shape said stock to desired configuration.

23. In an apparatus of the character described, a form having a cavity and adapted to receive stock across its mouth, a suction plunger adapted to reciprocate in said form, said suction plunger having a cavity situated at least partially in said form and adapted to receive a spud, said stock adapted to lie across the cavity of said suction plunger to close the same, means for exhausting air from said plunger cavity to draw said stock into said cavity, means for causing said suction plunger to recede in said form to draw said stock into said form and adjacent said plunger, and a device for forming with said form and plunger cavity a die adapted to incorporate said spud in said stock and to shape said stock to desired configuration.

24. In an apparatus of the character described, a suction plunger having a cavity adapted to receive a spud, a form in which said suction plunger is adapted to reciprocate, means for drawing stock into the plunger cavity, means for causing the suction plunger to recede in said form to draw stock into said form and adjacent said plunger, and a plunger adapted to engage said stock to shape it to said form and plunger cavity and to thus incorporate said spud in the stock.

25. In an apparatus of the character described, a suction plunger having a cavity adapted to receive a spud, a form in which said suction plunger is adapted to reciprocate, means for drawing stock into the plunger cavity, means for drawing stock into the form about and adjacent the plunger, in combination with a second form, a plunger in said second form and adapted to engage stock in the plunger cavity and form first mentioned to shape said stock to said plunger cavity and form and to incorporate said spud in the stock.

26. The combination as specified in claim 25, wherein said second form is adapted to receive stock across its mouth, and said plunger in said second form is adapted to recede in said second form to uniformly draw said stock into said second form in such manner as to leave said stock with a wall of uniform thickness.

27. In an apparatus of the character described, a suction plunger having a cavity adapted to receive a spud, a form in which said plunger is adapted to reciprocate, means for drawing stock into the plunger cavity, means for drawing stock into the form adjacent and about the plunger, the form and plunger cavity adapted to provide the female member of a die designed to provide the comparatively rigid section of a valve ball and to incorporate the spud therein, in combination with a second form, a plunger adapted to reciprocate therein, the second form adapted to receive stock across its mouth to provide the relatively flexible section of a valve ball, and means whereby said second plunger can serve as a pressure plunger to provide the male member of said die to produce said comparatively rigid section, and as a suction plunger adapted to draw stock into said second form to produce said comparatively flexible section.

28. The combination as specified in claim 27, wherein means is provided for bringing said forms together to unite said sections and to sever surplus material from the stock.

29. In an apparatus of the character described, a suction plunger having a cavity adapted to receive a spud, a form in which said plunger is adapted to reciprocate, means for exhausting air from said plunger cavity to draw stock into the plunger, means for causing said suction plunger to recede in said form to draw stock into said form, a second form opposite the form mentioned, a plunger adapted to reciprocate in said second form, the second plunger adapted to cooperate with the first form and plunger cavity to shape said stock in said form and cavity and to incorporate said spud in said stock, and being further adapted to draw stock placed across the mouth of the second form into said second form, for the purpose described.

30. In an apparatus of the character described, a form having a cavity adapted to receive stock across its mouth, a suction plunger adapted to reciprocate in said form, said suction plunger having a cavity adapted to receive a spud, said stock adapted to lie across the cavity of said suction plunger to close the same, means for exhausting air from said plunger cavity to draw said stock into said plunger cavity, means for causing said suction plunger to recede in said form to draw said stock into said form and adjacent said plunger, a second form opposite the form mentioned and adapted to receive stock across its mouth, a plunger in said second form and adapted to cooperate with the first form and plunger cavity to shape the stock in said first form and plunger cavity and to incorporate said spud in said stock, and further adapted to recede in said second form to draw its stock in the form, and means for bringing said forms together to unite said sections.

Signed at Stamford, in the county of Fairfield, and State of Connecticut, this 29th day of January, A. D. 1924.

FREDERICK H. SCHAVOIR.